(12) United States Patent
Ozols et al.

(10) Patent No.: US 11,668,979 B2
(45) Date of Patent: Jun. 6, 2023

(54) LIQUID CRYSTAL CELL COMPRISING A STACK OF FUNCTIONAL LAYERS INCLUDING FIRST AND SECOND DIELECTRIC LAYERS AND A TRANSPARENT ELECTRODE LAYER EACH HAVING A REFRACTIVE INDEX

(71) Applicant: Lightspace Technologies, SIA, Marupes novads (LV)

(72) Inventors: Ainars Ozols, Siguldas novads (LV); Ilmars Osmanis, Mārupes novads (LV); Kriss Osmanis, Babītes novads (LV); Martins Narels, Riga (LV); Gatis Mozolevskis, Saldus Novads (LV); Roberts Zabels, Riga (LV)

(73) Assignee: Lightspace Technologies, SIA, Marupes Novads (LV)

( * ) Notice: Subject to any disclaimer, the term of this patent is extended or adjusted under 35 U.S.C. 154(b) by 48 days.

(21) Appl. No.: 17/404,392

(22) Filed: Aug. 17, 2021

(65) Prior Publication Data

US 2023/0056688 A1    Feb. 23, 2023

(51) Int. Cl.
*G02F 1/1337*    (2006.01)
*G02F 1/1343*    (2006.01)
(Continued)

(52) U.S. Cl.
CPC .... *G02F 1/133742* (2021.01); *G02F 1/13439* (2013.01); *G02F 1/13471* (2013.01); *G02F 1/133305* (2013.01); *G02F 2202/42* (2013.01)

(58) Field of Classification Search
CPC .......... G02F 2202/42; G02F 1/133357; G02F 1/133738
See application file for complete search history.

(56) References Cited

U.S. PATENT DOCUMENTS

2005/0122447 A1* 6/2005 Shiota ............... G02F 1/136209
349/110
2007/0090457 A1* 4/2007 Lee ......................... H01L 27/12
438/149
(Continued)

FOREIGN PATENT DOCUMENTS

EP    3569922 B1    8/2000

OTHER PUBLICATIONS

European Patent Office, Notification of Transmittal of the International Search Report and the Written Opinion of the International Searching Authority, or the Declaration, mailed Nov. 17, 2022, 13 pages.

*Primary Examiner* — Paul C Lee
(74) *Attorney, Agent, or Firm* — Ziegler IP Law Group, LLC (57) ABSTRACT

A liquid crystal cell including at least two substrates transparent to visible part of light spectrum, a liquid crystal layer encased between the substrates, and a stack of functional layers formed over the substrates and enclosed between a given substrate and the liquid crystal layer. In a direction from the given substrate towards the liquid crystal layer, said stack comprises a first dielectric layer, a transparent electrode layer, and a second dielectric layer. A refractive index of the first dielectric layer lies in a range between a refractive index of the given substrate and a refractive index of the transparent electrode layer. A refractive index of the second dielectric layer lies in a range between the refractive index of the transparent electrode layer and a refractive index of the liquid crystal layer corresponding to a homeotropic alignment of a liquid crystal material of the liquid crystal layer.

13 Claims, 5 Drawing Sheets

(51) Int. Cl.
  *G02F 1/1333* (2006.01)
  *G02F 1/1347* (2006.01)

(56) References Cited

U.S. PATENT DOCUMENTS

| | | |
|---|---|---|
| 2015/0085229 A1 | 3/2015 | Park et al. |
| 2018/0120637 A1* | 5/2018 | Yun ..................... G02B 6/0025 |
| 2018/0196302 A1* | 7/2018 | Bae ..................... G02B 6/0025 |
| 2019/0325791 A1* | 10/2019 | Lin ..................... G02B 5/0242 |
| 2020/0209669 A1 | 7/2020 | Osmanis et al. |
| 2020/0225557 A1* | 7/2020 | Li ............................ G02F 1/29 |

* cited by examiner

LIQUID CRYSTAL CELL COMPRISING A STACK OF FUNCTIONAL LAYERS INCLUDING FIRST AND SECOND DIELECTRIC LAYERS AND A TRANSPARENT ELECTRODE LAYER EACH HAVING A REFRACTIVE INDEX

TECHNICAL FIELD

The present disclosure relates to liquid crystal cells. Moreover, the present disclosure relates to methods for preparing a substrate for use in a liquid crystal cell.

BACKGROUND

A typical volumetric three-dimensional display can be constructed using a rear image projection unit and a stack of switching optical diffuser elements. Conventionally, an optical diffuser element is implemented as a liquid crystal cell that is filled with a polymer-free chiral nematic liquid crystal, wherein a homeotropic layer of the liquid crystal cell is made of a polyimide. A substrate for the liquid crystal cell is typically an indium tin oxide (ITO) glass, wherein indium tin oxide (ITO) is used as a transparent electrode layer, which is separated from a mineral glass substrate by a sputtered silicon dioxide ($SiO_2$) layer in an order of few tens of nanometres. Moreover, the ITO glass is treated by additional layers of flexo-printed silicon oxide ($SiO_x$), which acts as a dielectric barrier by increasing a breakdown voltage of the optical diffuser element. A single layer or multiple layers of silicon oxide ($SiO_x$) can be applied on top of the transparent electrode layer in an order of tens of nanometres up to several hundred nanometres. Further more vacuum deposition methods could be used to deposit silicon oxide.

It will be appreciated that the glass substrate and the silicon dioxide ($SiO_2$) layer have substantially similar refractive indices, namely approximately 1.5, whereas a refractive index of the ITO electrode layer is typically in a range of 1.9-2.1. Moreover, refractive indices of the silicon oxide ($SiO_x$) layer and a liquid crystal layer is very different, namely approximately 1.5 for the silicon oxide ($SiO_x$) layer versus approximately 1.7 for the liquid crystal layer. Furthermore, a refractive index of the homeotropic polyimide layer does not facilitate refractive index matching between the flexo-printed silicon oxide ($SiO_x$) layer and the liquid crystal layer. A disparity in the refractive indices within the liquid crystal cell results in internal interfaces from which light reflects strongly. When used in display applications, this adversely impacts image contrast, image brightness and the optical diffuser element's resistance to ambient lighting conditions.

Moreover, a problem with flexo-printed silicon oxide ($SiO_x$) layers is that they have a substantial number of structural defects, namely hole-like defects, which lower a dielectric resistance of the optical diffuser element locally and are also responsible for dielectric breakdown of the optical diffuser element. In operation, the optical diffuser element experiences high-voltages, tolerating electric field intensities in a range of 8-20 MV/m across a cell gap.

Another problem with using silicon oxide ($SiO_x$) is that it is a non-stoichiometric silicon dioxide ($SiO_2$) and thus has dangling oxygen bonds, which have to be passivated by annealing in an oxygen atmosphere. Otherwise, the optical diffuser elements become susceptible to defect formation and dielectric breakdown by adsorbing volatile organic compounds and moisture from air. This introduces an additional processing step of annealing that is rather lengthy (typically taking a few hours).

Moreover, depending on a total area of the optical diffuser element, the ITO electrode layer can be patterned, for example, in a comb-like fashion, so as to limit a local current in a case of formation of a conduction channel within the liquid crystal layer, thereby preventing a complete dielectric breakdown. However, such patterning introduces scattering sites on an internal surface of the optical diffuser element, which negatively impacts an apparent image quality during use.

It will be appreciated that a conventional process for preparing a substrate for use in a liquid crystal cell is a multi-step process, which provides dielectric resistance and switching properties at a cost of compromised optical performance. Thus, there exists a need for improving optical diffuser elements in terms of increased tolerance towards high driving voltage as well as improved optical performance.

SUMMARY

The present disclosure relates to an improved liquid crystal cell. The present disclosure also relates to an improved method for preparing a substrate for use in a liquid crystal cell. Moreover, the present disclosure also seeks to provide a solution to the existing problems of conventional liquid crystal cells.

In a first aspect, an embodiment of the present disclosure provides a liquid crystal cell comprising:

at least two substrates that are transparent to a visible part of a light spectrum;

a liquid crystal layer that is encased between the at least two substrates;

a stack of functional layers that are formed over the at least two substrates and that are enclosed between a given substrate and the liquid crystal layer, wherein the stack of functional layers comprises, in a direction from the given substrate towards the liquid crystal layer, a first dielectric layer;

a transparent electrode layer; and a second dielectric layer, wherein a refractive index of the first dielectric layer lies in a range between a refractive index of the given substrate and a refractive index of the transparent electrode layer, and a refractive index of the second dielectric layer lies in a range between the refractive index of the transparent electrode layer and a refractive index of the liquid crystal layer corresponding to a homeotropic alignment of a liquid crystal material of the liquid crystal layer.

In a second aspect, an embodiment of the present disclosure provides a method for preparing a substrate, the method comprising:

forming a first dielectric layer over the substrate;

forming a transparent electrode layer over the first dielectric layer; and forming a second dielectric layer over the transparent electrode layer, wherein the first dielectric layer is formed in a manner that a refractive index of the first dielectric layer lies in a range between a refractive index of the substrate and a refractive index of the transparent electrode layer, and the second dielectric layer is formed in a manner that a refractive index of the second dielectric layer lies in a range between the refractive index of the transparent electrode layer and a refractive index of a liquid crystal material corresponding to a homeotropic alignment of the liquid crystal material.

Embodiments of the present disclosure substantially eliminate or at least partially address the aforementioned problems in the prior art, and improve an optical efficiency of the liquid crystal cell by minimizing unwanted reflections from inner interfaces between different layers.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In a first aspect, an embodiment of the present disclosure provides a liquid crystal cell comprising:

at least two substrates that are transparent to a visible part of a light spectrum;

a liquid crystal layer that is encased between the at least two substrates;

a stack of functional layers that are formed over the at least two substrates and that are enclosed between a given substrate and the liquid crystal layer, wherein the stack of functional layers comprises, in a direction from the given substrate towards the liquid crystal layer, a first dielectric layer;

a transparent electrode layer; and a second dielectric layer, wherein a refractive index of the first dielectric layer lies in a range between a refractive index of the given substrate and a refractive index of the transparent electrode layer, and a refractive index of the second dielectric layer lies in a range between the refractive index of the transparent electrode layer and a refractive index of the liquid crystal layer corresponding to a homeotropic alignment of a liquid crystal material of the liquid crystal layer.

In a second aspect, an embodiment of the present disclosure provides a method for preparing a substrate, the method comprising:

forming a first dielectric layer over the substrate;

forming a transparent electrode layer over the first dielectric layer; and forming a second dielectric layer over the transparent electrode layer, wherein the first dielectric layer is formed in a manner that a refractive index of the first dielectric layer lies in a range between a refractive index of the substrate and a refractive index of the transparent electrode layer, and the second dielectric layer is formed in a manner that a refractive index of the second dielectric layer lies in a range between the refractive index of the transparent electrode layer and a refractive index of a liquid crystal material corresponding to a homeotropic alignment of the liquid crystal material.

The aforementioned liquid crystal cell has improved optical and dielectric characteristics, as compared to conventional liquid crystal cells of the prior art. The refractive indices of the first dielectric layer and the second dielectric layer are tailored to lie between the refractive indices of their respective adjacent layers (namely, layers between which they are sandwiched). Thus, in addition to acting as a barrier for migration of free ions and impurities from the given substrate into the transparent electrode layer and further inside the liquid crystal layer, the first dielectric layer and the second dielectric layer also act as refractive-index matching layers. In other words, the refractive index does not change abruptly from one layer to another layer within the liquid crystal cell. This improves an optical efficiency of the liquid crystal cell by minimizing unwanted reflections from inner interfaces between different layers.

The aforementioned liquid crystal cell can have application in image recreation. As an example, the liquid crystal cell could be practically implemented as an optical diffuser element (namely, a transient light shutter) in a solid-state volumetric three-dimensional display. As an example, a volumetric three-dimensional display could employ a rear image projection unit along with a stack of such optical diffuser elements. This allows the volumetric three-dimensional display to have a multi-focal display architecture and to create three-dimensional imagery visible to an unaided human eye.

Optionally, the at least two substrates are flexible. Optionally, in this regard, the at least two substrates are made of an optically-transparent organic material. As an example, a given substrate could be implemented as a sheet or a film made of polycarbonate, poly(methyl methacrylate) or the like. The technical benefit of employing such flexible substrates in the liquid crystal cell is that it makes the liquid crystal cell thinner, lighter in weight, rugged with greatly minimized propensity for breakage, and highly durable, in comparison to liquid crystal cells employing conventional rigid glass substrates.

Alternatively, the at least two substrates could be made of a mineral glass. The mineral glass could be a display glass, a soda-lime glass, quartz, or another analogous glass material.

Optionally, the at least two substrates are also transparent to an infrared part of the light spectrum.

Optionally, at least the second dielectric layer comprises silicon oxynitride ($SiO_xN_y$). Additionally, optionally, the first dielectric layer also comprises silicon oxynitride ($SiO_xN_y$). The first dielectric layer could alternatively be made of any of: silicon dioxide ($SiO_2$), silicon oxide ($SiO_x$).

One of the many technical benefits of using silicon oxynitride ($SiO_xN_y$) in a given dielectric layer is that the given dielectric layer is free from hole-like defects, which, in turn, improves a dielectric strength of the given dielectric layer substantially, in comparison to a dielectric layer made of silicon oxide ($SiO_x$). In deed hole defects are characteristic to flexoprinted SiOx. In case, the SiOx (SiO2) is sputtered, quality improves, but the layer suffers from these oxygen dangling bonds and requires annealing as a passivating treatment. A dielectric constant of silicon oxynitride ($SiO_xN_y$) depends on a ratio of oxygen and nitrogen therein. Notably, the dielectric constant of silicon oxynitride ($SiO_xN_y$) lies in a range of 6-10, whereas a dielectric constant of silicon oxide ($SiO_x$) is much less and lies in a range of 3.3-4.4, and a dielectric constant of a typical polyimide used in conventional liquid crystal displays is approximately 3.6. It will be appreciated that silicon oxide ($SiO_x$) has many dangling oxygen bonds, which can interact with molecules of the liquid crystal material and can alter switching characteristics of a liquid crystal cell made using silicon oxide ($SiO_x$) in a negative way. In this regard, an inclusion of nitrogen in silicon oxynitride eliminates such dangling bonds, thereby making the given dielectric layer insusceptible to moisture and volatile organic compounds. This also eliminates a need for performing a thermal annealing process in an oxygen atmosphere, as is required in case of a dielectric layer made of silicon oxide ($SiO_x$). This, in turn, minimizes a number of impurities within the liquid crystal cell, and thus, minimizes premature failure rates and prevents cell failure. Furthermore, as at least the second dielectric layer is free from hole-like defects and improves the overall dielectric strength of the liquid crystal cell, there is no need of patterning the transparent electrode layer to limit a local electric current. As no additional scribe or ablation lines are present in the liquid crystal cell, no unwanted light scattering occurs. As a result, the liquid crystal cell has an improved transparency. Thus, optical characteristics of the liquid crystal cell are improved greatly.

As mentioned earlier, the refractive indices of the first dielectric layer and the second dielectric layer are tailored to lie between the refractive indices of their respective adjacent layers (namely, layers between which they are sandwiched). In this regard, using silicon oxynitride ($SiO_xN_y$) makes it possible to tune the refractive indices of the first dielectric layer and the second dielectric layer in a wide range, for example, in a range of 1.5 to 1.8 or even higher. As an example, the refractive index of the first dielectric layer can be tuned to lie in a range of 1.6 to 1.7. It will be appreciated that tuning the refractive index is possible to a lesser extent in case of silicon oxide ($SiO_x$), as compared to silicon oxynitride ($SiO_xN_y$); however, silicon oxide ($SiO_x$) can still be used in the first dielectric layer.

Moreover, optionally, the first dielectric layer and the second dielectric layer are formed on the given substrate using a suitable Plasma Vapour Deposition (PVD) process. An example of a PVD process is a reactive sputtering process, which employs a conductive or semi-conductive sputtering target inside a reactive atmosphere. Pursuant to embodiments of the present disclosure, a preferred sputtering process is a medium frequency (MF) magnetron reactive sputtering, also known as magnetron-ion sputtering. A technical benefit of depositing silicon oxynitride ($SiO_xN_y$) by using sputtering is that it has low internal stresses, which, in turn, reduces bowing of the given substrate as compared to conventional silicon oxide layers. As a consequence, optical defects associated with selective reflection due to Fabri-Perrot effects are minimized. Moreover, magnetron-ion sputtering provides a high yield and is thus suitable for manufacturing on a large scale. Further optionally the first dielectric layer and the second dielectric layer can be formed using an atomic layer deposition. PVD brings however benefits over the atomic layer deposition since good characteristics of cost, film growth speed and quality, as well as process control.

When silicon oxynitride ($SiO_xN_y$) is to be deposited to form a given dielectric layer, argon may be employed as a carrier gas with oxygen and nitrogen in a gas mixture, while silicon is employed as a semi-conductive sputtering target. The sputtering target can be a planar silicon target or a rotary silicon target. In a particular case of using oxygen and nitrogen as reactive components in the gas mixture, it is possible to use same sputtering target(s) for forming the first dielectric layer and the second dielectric layer. It will be appreciated that when the first dielectric layer and the second dielectric layer are formed by depositing silicon oxide ($SiO_x$) and silicon oxynitride ($SiO_xN_y$), respectively, at least two different sputtering targets are required. This makes the process of forming these dielectric layers slightly more complicated.

Optionally, a relative concentration of oxygen and nitrogen in silicon oxynitride ($SiO_xN_y$) is varied to create a gradient in the refractive index of at least one of: the first dielectric layer, the second dielectric layer. The relative concentration of oxygen and nitrogen in silicon oxynitride ($SiO_xN_y$) depends on any of: molar ratios, volume ratios, partial pressures of oxygen and nitrogen within a vacuum chamber where a sputtering process is performed. As an example, a given dielectric layer could be formed by forming several thin consecutive sub-layers (for example, three, four, five or more layers), wherein different relative concentrations of oxygen and nitrogen are employed when forming different sub-layers. The refractive index of the given dielectric layer so formed changes in a gradient manner. Optionally, the relative concentration of oxygen and nitrogen is varied (namely, adjusted) in real time to achieve a linear change in the refractive index across a thickness of the at least one of: the first dielectric layer, the second dielectric layer.

Moreover, the first dielectric layer and the second dielectric layer are preferably made thicker as compared to conventional liquid crystal cells. Optionally, a thickness of the first dielectric layer lies in a range of 50 nm to 200 nm. The thickness of the first dielectric layer may be from 50 nm, 55 nm, 60 nm or 65 nm up to 80 nm, 100 nm, 140 nm or 200 nm. As an example, the thickness of the first dielectric layer lies in a range of 60 nm to 80 nm. Optionally, a thickness of the second dielectric layer lies in a range of 70 nm to 500 nm. The thickness of the second dielectric layer may be from 70 nm, 120 nm, 150 nm or 175 nm up to 150 nm, 200 nm, 250 nm, 350 nm or 500 nm. As an example, the thickness of the second dielectric layer lies in a range of 150 nm to 250 nm.

Furthermore, an additional technical benefit of using silicon oxynitride ($SiO_xN_y$) in the second dielectric layer is that it facilitates a homeotropic alignment of the molecules of the liquid crystal material. Throughout the present disclosure, the term "homeotropic alignment" refers to a state in which rod-like molecules of the liquid crystal material align perpendicularly to the given substrate. In other words, the "homeotropic alignment of the liquid crystal material" is an alignment of the molecules of the liquid crystal material that pertains to an optically transparent state of the liquid crystal layer. When depositing silicon oxynitride ($SiO_xN_y$) to form the second dielectric layer, no additional homeotropic polyimide has to be deposited on it to facilitate the homeotropic alignment, thereby avoiding a need for an additional material and an additional processing step. The molecules of the liquid crystal material that are in direct contact with or in a vicinity of the second dielectric layer (made of silicon oxynitride ($SiO_xN_y$)) align homeotropically. Moreover, a switching speed of the liquid crystal cell (namely, a speed with which the liquid crystal cell switches from a first optical state to a second optical state) is increased when silicon oxynitride ($SiO_xN_y$) is used as compared to a conventional homeotropic polyimide layer. Herein, the first optical state and the second optical state may be an optically diffuse state and an optically transparent state of the liquid crystal cell, respectively. The optically diffuse state corresponds to a focal-conic state of the liquid crystal material, whereas the optically transparent state corresponds to the homeotropic alignment of the liquid crystal material.

Additionally, optionally, the second dielectric layer is etched to support alignments other than the homeotropic alignment. Such etching may, for example, be implemented as an angled ion etching. As an example, by such etching, an alignment lying in a range of 60 degrees to 89 degrees can be achieved in the molecules of the liquid crystal material. Utilization of such an off-homeotropic alignment can yield a potential compromise between switching from the first optical state to the second optical state and from the second optical state to the first optical state. It will be appreciated that utilization of a homeotropic alignment facilitates a higher switching speed from the first optical state to the second optical state (namely, the diffuse state to the transparent state) as compared to a switching speed from the second optical state to the first optical state. On the other hand, an off-homeotropic alignment can be optimized to achieve a reduction in a total time required for an entire switching cycle, which is of importance in practical applications of image output on such liquid crystal cells.

Moreover, optionally, the transparent electrode layer comprises any of:
indium tin oxide (ITO),
doped zinc oxide (ZnO), wherein ZnO is doped with aluminium or hydrogen,
a mesh of metallic nanowires.

A transparent electrode layer made of indium tin oxide (ITO) has a sheet resistance ranging from 40 ohms/square to 150 ohms/square.

The transparent electrode layer may also be deposited by employing a PVD process. As an example, indium tin oxide (ITO) may be deposited using a DC magnetron sputtering. In such a case, a planar indium tin oxide (ITO) target may be employed.

Furthermore, optionally, the liquid crystal material is a polymer-free, cholesteric liquid crystal. Optionally, the liquid crystal material is a chiral nematic liquid crystal comprising a base of a nematic crystal and a chiral dopant added in 1-10% by mass (as an example 5 grams of a chiral dopant and 95 grams of a base of a nematic crystal). A concentration of the chiral dopant depends on a helical twisting power of the chiral dopant. Optionally, in case of a chiral dopant with a high twisting power, the concentration of the chiral dopant may lie in a range of 1-4% by mass; more optionally, in a range of 2-2.5% by mass. Optionally, in case of a chiral dopant with a low twisting power, the concentration of the chiral dopant may lie in a range of 4-10% by mass; more optionally, in a range of 8-8.5% by mass. In practical terms "% by mass" refers in general to x grams of dopant in x+y grams of total liquid crystal material i.e x/(x+y) %.

A technical benefit of using such a liquid crystal material is that it enables an alleviated process of preparation in contrast to polymer-containing liquid crystal materials, as no process of photopolymerization is required. This improves a yield and repeatability of the process of preparation. From an electro-optical standpoint, an absence of stabilizing polymer networks facilitates faster response times in switching between the aforesaid optical states of the liquid crystal cell upon application or removal of an electric field.

Moreover, optionally, the liquid crystal cell further comprises a plurality of spacers dispensed between the at least two substrates. A thickness of the liquid crystal layer depends on a size of a given spacer. Using such spacers ensures uniform thickness of the liquid crystal cell. This results in uniform optical properties across an entire area of the liquid crystal cell. Additionally, optionally, a refractive index of the plurality of spacers is selected to correspond to the refractive index of the liquid crystal layer in the second optical state, namely the optically transparent state. This improves the optical efficiency of the liquid crystal cell by minimizing unwanted reflections from inner interfaces between the plurality of spacers and the liquid crystal material.

Furthermore, optionally, the liquid crystal cell also comprises a sealing contour of a polymer material that seals the liquid crystal layer between the at least two substrates. The sealing contour protects the liquid crystal material from air and dust (ambient atmosphere), and thus, ensures a reliable operation of the liquid crystal cell. The polymer material can be deposited around a perimeter of the liquid crystal cell when the at least two substrates are pressed together, and then polymerised to form the sealing contour.

When filling the liquid crystal material, at least one of the at least two substrates is treated with a dispensing of the plurality of spacers. The liquid crystal material can be filled using various techniques. One of the techniques is to employ capillary action within a vacuum chamber, wherein the liquid crystal cell is sealed to leave ports, which are then filled with the liquid crystal material through capillary action. Another of these techniques is a One Drop Fill (ODF) process, which is a direct-fill process requiring accurate micro-dispensers to dispense droplets of the liquid crystal material directly on to one of the at least two substrates (treated with the stack of functional layers) before pressing together the at least two substrates and sealing the liquid crystal cell.

The present disclosure also relates to the aforementioned method as described above. The method is performed prior to assembling a liquid crystal cell. Various embodiments and variants disclosed above, with respect to the aforementioned first aspect, apply mutatis mutandis to the method.

Optionally, in the method, at least the first dielectric layer and the second dielectric layer are formed on the substrate using magnetron-ion sputtering.

Optionally, in the method, at least the second dielectric layer comprises silicon oxynitride ($SiO_xN_y$). In this regard, silicon oxynitride is deposited using a silicon target and an atmosphere of oxygen, nitrogen and an inert gas. Additionally, optionally, the first dielectric layer also comprises silicon oxynitride ($SiO_xN_y$).

Moreover, optionally, the step of forming a given dielectric layer comprises varying a relative concentration of oxygen and nitrogen in silicon oxynitride ($SiO_xN_y$) to create a gradient in the refractive index of at least one of: the first dielectric layer, the second dielectric layer. As an example, a given dielectric layer could be formed by forming several thin consecutive sub-layers, wherein different relative concentrations of oxygen and nitrogen are employed when forming different sub-layers. As a result, the refractive index of the given dielectric layer changes in a gradient manner. Optionally, the relative concentration of oxygen and nitrogen is varied (namely, adjusted) in real time to achieve a linear change in the refractive index across a thickness of the at least one of: the first dielectric layer, the second dielectric layer. Further optionally a layer, which has a refractive index of nx=(n2−n1)/2 or close to that (in range of +−10%), where n1 and n2 are corresponding refractive indices which need matching can be used.

Beneficially, the aforesaid method may be performed as a single united process. For illustration purposes only, there will now be considered an example implementation wherein the first dielectric layer and the second dielectric layer are formed by depositing silicon oxynitride ($SiO_xN_y$). In such an implementation, the method may be performed in a first deposition zone in which silicon oxynitride ($SiO_xN_y$) is deposited and a second deposition zone in which, for example, indium tin oxide (ITO) is deposited. In this implementation, the method is beneficially performed on the substrate, without a need to leave a vacuum chamber. In this regard, a decontaminated substrate is subjected to:

formation of the first dielectric layer in the first deposition zone, translation of the substrate towards the second deposition zone, formation of the transparent electrode layer in the second deposition zone, translation of the substrate back to the first deposition zone, and formation of the second dielectric layer in the first deposition zone.

The second deposition zone is shielded from the first deposition zone in a manner that any possibility for cross-contamination is excluded.

Furthermore, optionally, the method further comprises etching the second dielectric layer to support alignments other than a homeotropic alignment. Such etching may be performed using reactive ion etching. The step of etching may be performed subsequent to the aforementioned steps illustrated in the example implementation, without breaking vacuum conditions. Alternatively, the step of etching may be performed as an independent step within a different vacuum chamber.

EXPERIMENTAL PART

It has been observed experimentally that when formed by depositing silicon oxynitride ($SiO_xN_y$), a preferable thickness of the first dielectric layer lies in a range of 60 nm to 80 nm (such as 70 nm), while a preferable thickness of the second dielectric layer lies in a range of 175 nm to 225 nm (such as 200 nm). Moreover, it has been observed experimentally that switching speeds of a liquid crystal cell are increased when silicon oxynitride ($SiO_xN_y$) is used, as compared to liquid crystal cells employing conventional homeotropic polyimide layers. An average improvement in the switching speeds is in a range of 2-5%, as compared to liquid crystal cells employing conventional homeotropic polyimide layers.

DETAILED DESCRIPTION OF THE DRAWINGS

Figure 1A:
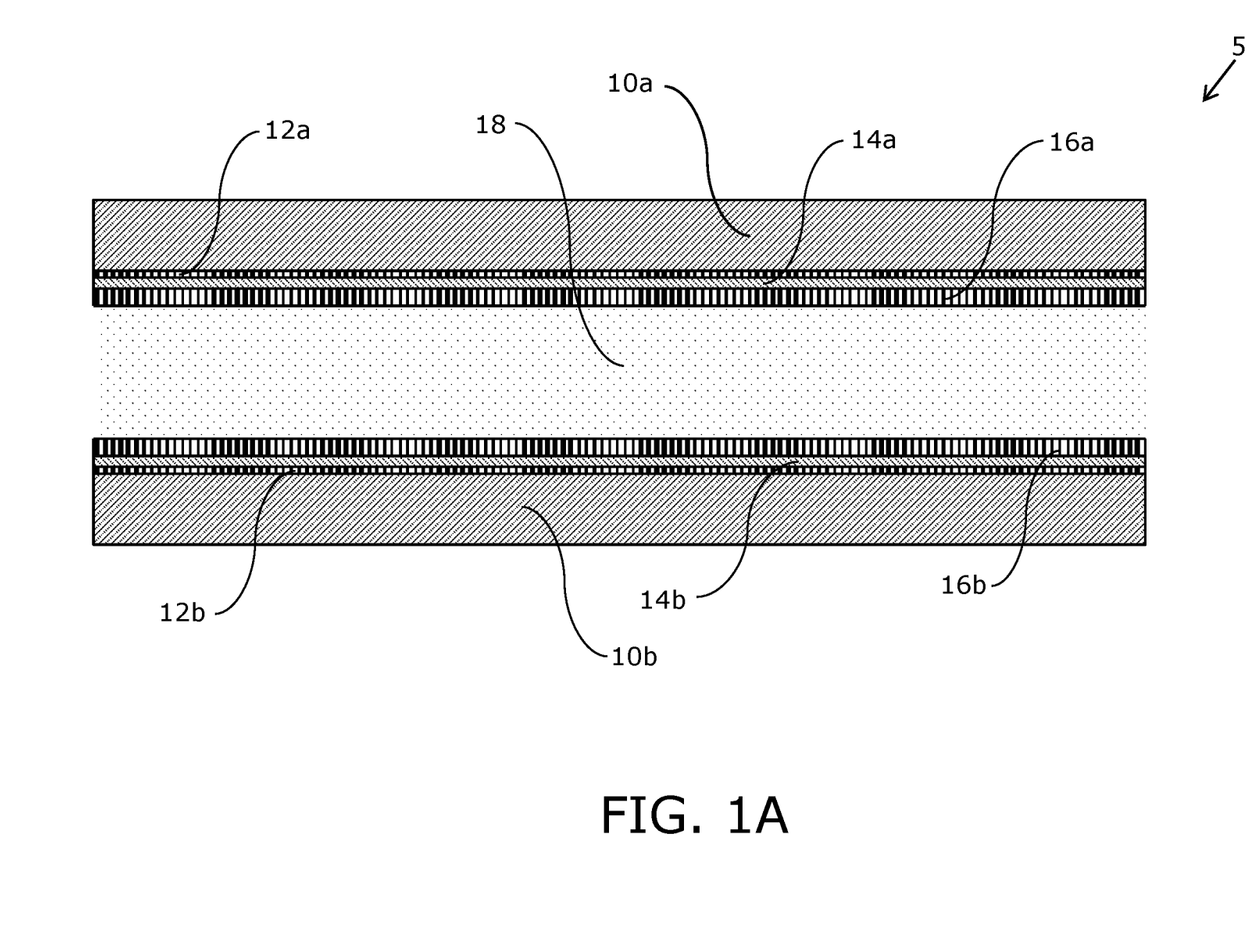
FIGS. 1A and 1B are schematic diagrams of cross-sections of a liquid crystal cell, in accordance with various embodiments of the present disclosure.
Figure 1B:
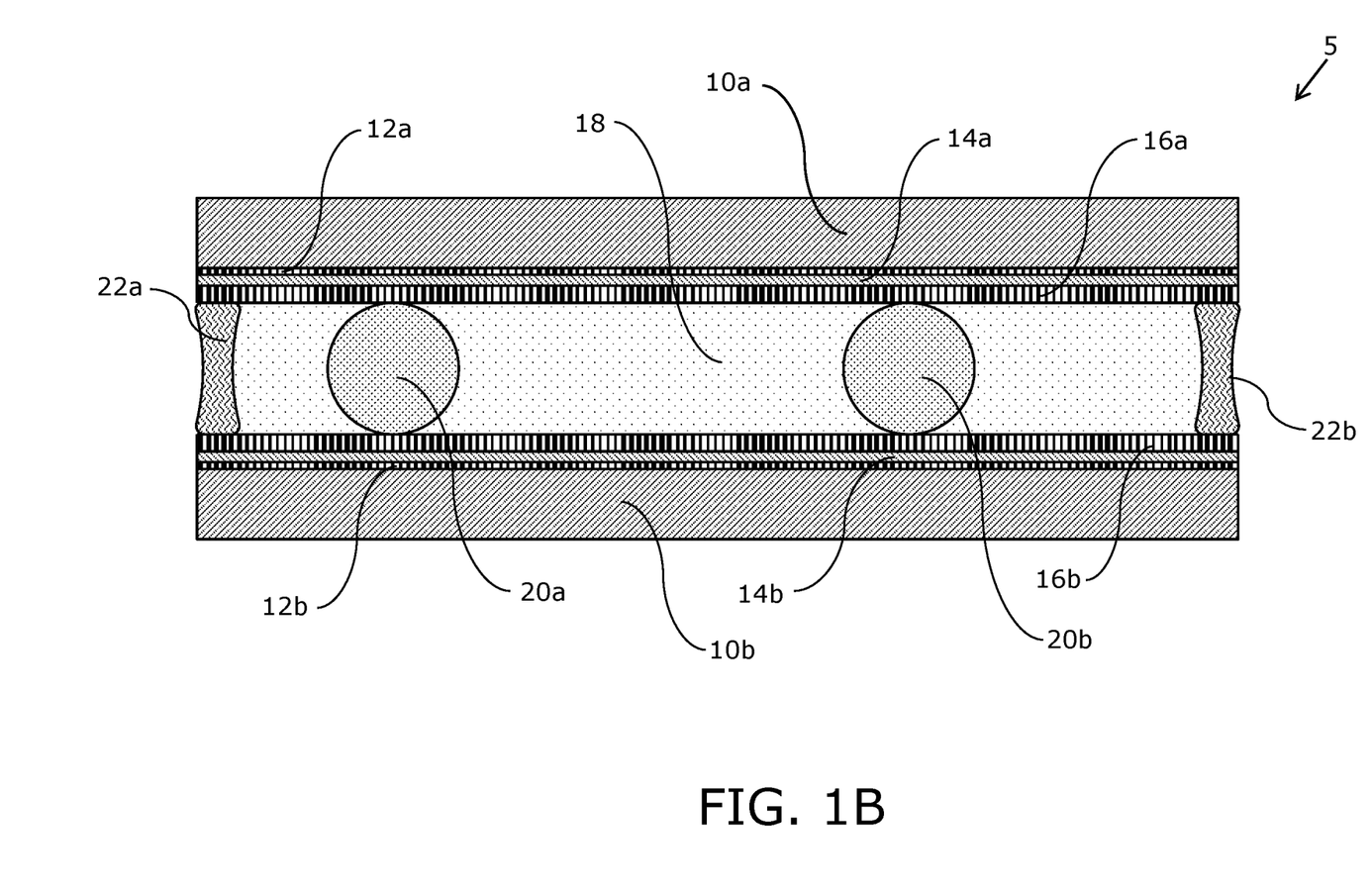

FIGS. 1A and 1B are schematic diagrams of cross-sections of a liquid crystal cell 5, in accordance with various embodiments of the present disclosure. The liquid crystal cell 5 comprises:
  at least two substrates, depicted as substrates 10a and 10b,
  a stack of functional layers, formed on each substrate 10a and 10b, comprising:
    a first dielectric layer, depicted as first dielectric layers 12a and 12b,
    a transparent electrode layer, depicted as transparent electrode layers 14a and 14b, and
    a second dielectric layer, depicted as second dielectric layers 16a and 16b, and
  a liquid crystal layer 18 between the at least two substrates.

With reference to FIG. 1B, optionally, the liquid crystal cell 5 further comprises:
  a plurality of spacers, depicted as spacers 20a and 20b, and
  a sealing contour, depicted as 22a and 22b.

It may be understood by a person skilled in the art that FIGS. 1A and 1B depict a simplified structure of the liquid crystal cell 5, for the sake of clarity, which should not unduly limit the scope of the claims herein. The person skilled in the art will recognize many variations, alternatives, and modifications of embodiments of the present disclosure.

Figure 2:
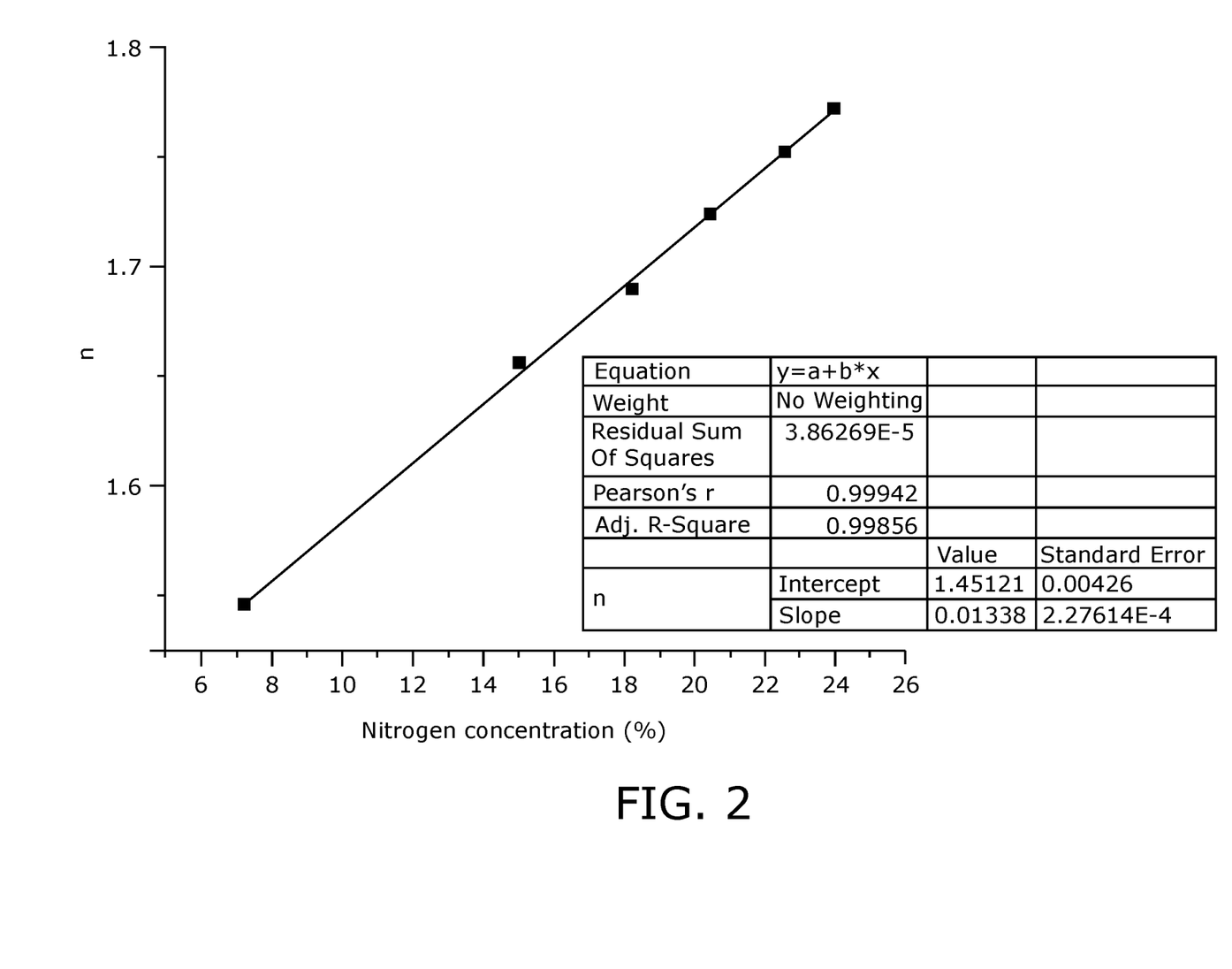
FIG. 2 depicts how a refractive index (n) of a given dielectric layer made from silicon oxynitride ($SiO_xN_y$) varies with a concentration (namely, in atmospheric %) of nitrogen in a gas mixture employed for sputtering.
Figure 3:
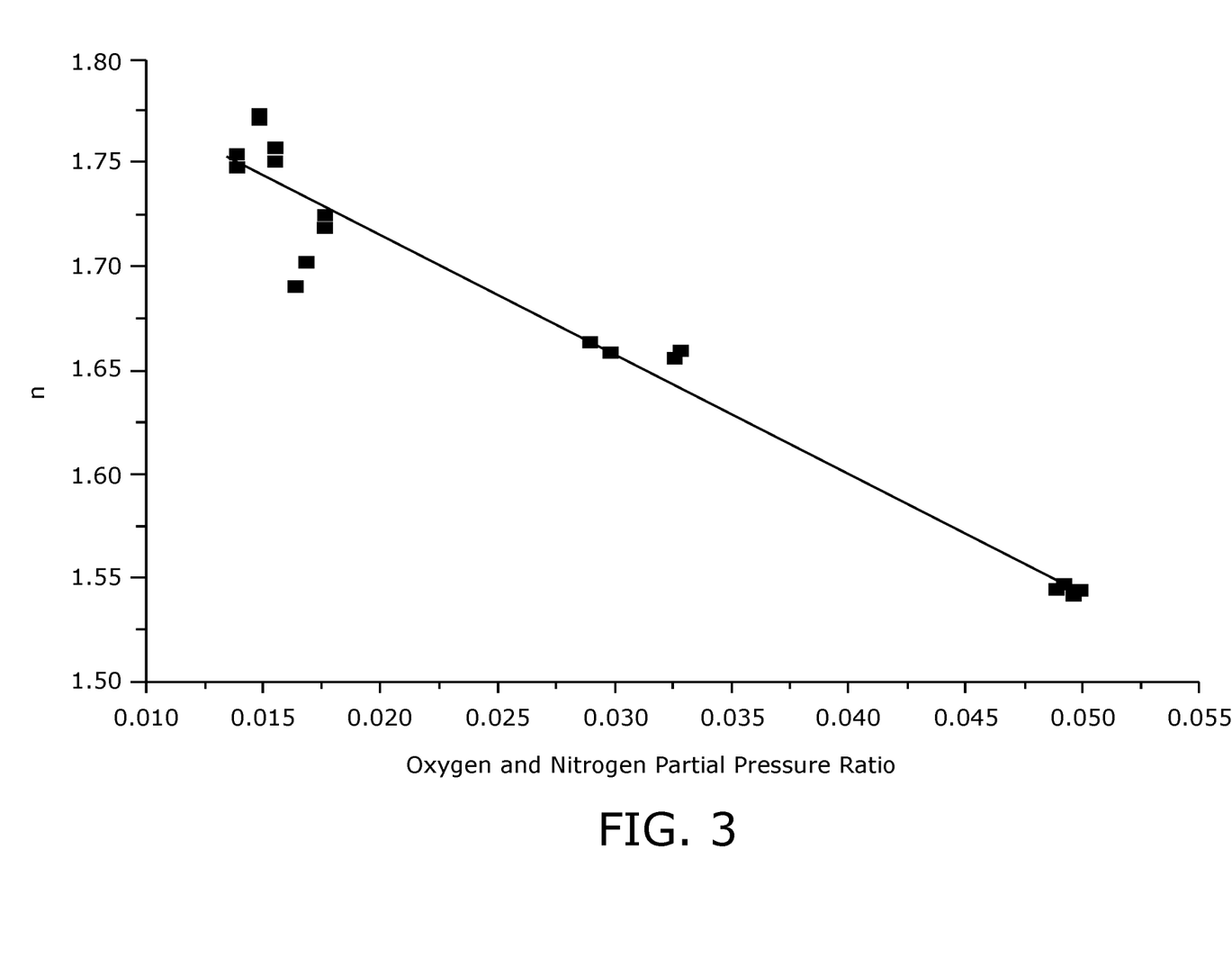
FIG. 3 depicts how the refractive index (n) of the given dielectric layer varies with a relative concentration (namely, in ratio of partial pressures of) oxygen and nitrogen in the gas mixture.

FIG. 2 depicts how a refractive index (n) of a given dielectric layer made from silicon oxynitride ($SiO_xN_y$) varies with a concentration (namely, in atmospheric %) of nitrogen in a gas mixture employed for sputtering, whereas FIG. 3 depicts how the refractive index (n) of the given dielectric layer varies with a relative concentration (namely, in ratio of partial pressures of) oxygen and nitrogen in the gas mixture.

It can be seen from FIGS. 2 and 3 that the refractive index of the given dielectric layer can be varied linearly with the concentration of nitrogen in the gas mixture.

Figure 4:
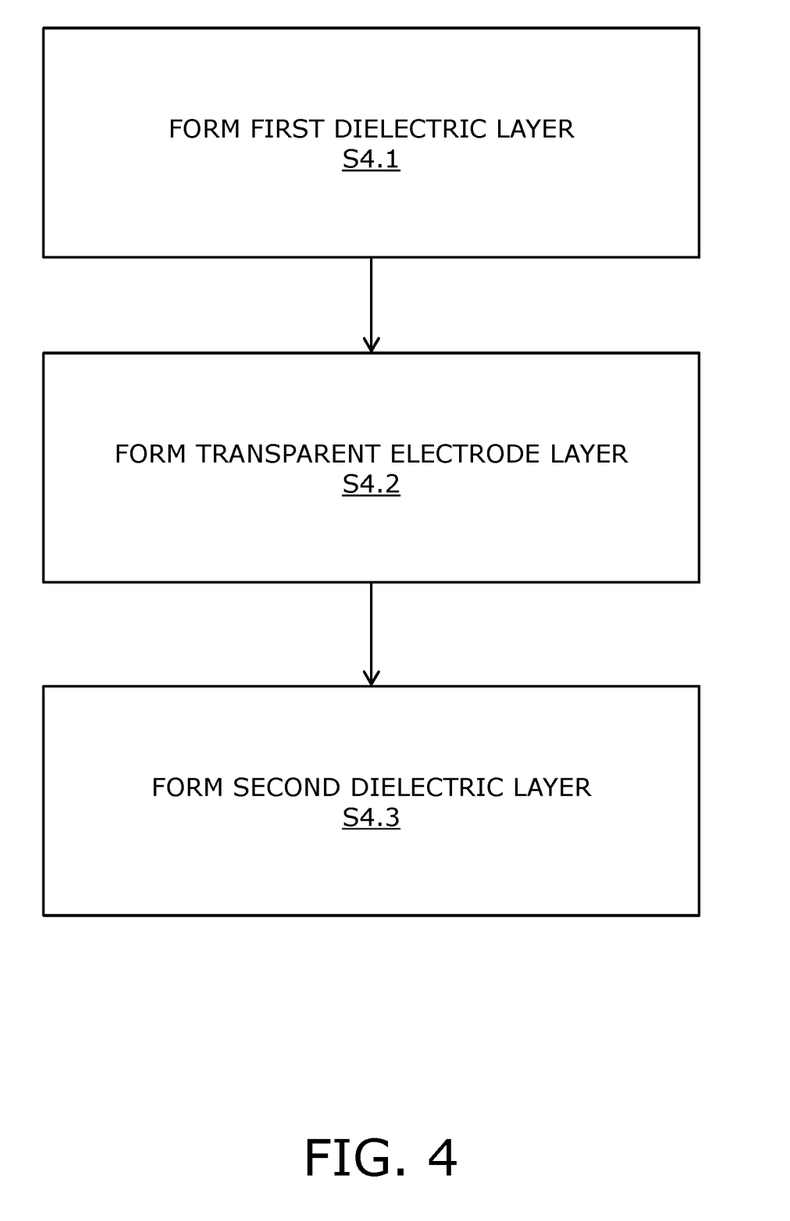
FIG. 4 depicts steps of a method for preparing a substrate, in accordance with an embodiment of the present disclosure.

Referring to FIG. 4, illustrated are steps of a method for preparing a substrate, in accordance with an embodiment of the present disclosure. At a step S4.1, a first dielectric layer is formed over the substrate. At a step S4.2, a transparent electrode layer is formed over the first dielectric layer. At a step S4.3, a second dielectric layer is formed over the transparent electrode layer. In the method, the first dielectric layer is formed in a manner that a refractive index of the first dielectric layer lies in a range between a refractive index of the substrate and a refractive index of the transparent electrode layer, while the second dielectric layer is formed in a manner that a refractive index of the second dielectric layer lies in a range between the refractive index of the transparent electrode layer and a refractive index of a liquid crystal material corresponding to a homeotropic alignment of the liquid crystal material.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. It will be appreciated that the terms "first", "second", "third" and the like used herein do not denote any order, quantity or importance, but rather are used to distinguish one element from another.

The invention claimed is:

1. A liquid crystal cell comprising:
   at least two substrates that are transparent to a visible part of a light spectrum;
   a liquid crystal layer that is encased between the at least two substrates;
   a stack of functional layers that are formed over the at least two substrates and that are enclosed between a given substrate and the liquid crystal layer, wherein the stack of functional layers comprises, in a direction from the given substrate towards the liquid crystal layer,
      a first dielectric layer;
      a transparent electrode layer; and
      a second dielectric layer,
   wherein a refractive index of the first dielectric layer lies in a range between a refractive index of the given substrate and a refractive index of the transparent electrode layer, and a refractive index of the second dielectric layer lies in a range between the refractive index of the transparent electrode layer and a refractive index of the liquid crystal layer corresponding to a homeotropic alignment of a liquid crystal material of the liquid crystal layer.

2. The liquid crystal cell of claim 1, wherein the liquid crystal material is a chiral nematic liquid crystal comprising a base of a nematic crystal and a chiral dopant added in 1-10% by mass.

3. The liquid crystal cell of claim 1, wherein at least the second dielectric layer comprises silicon oxynitride ($SiO_xN_y$).

4. The liquid crystal cell of claim 3, wherein a relative concentration of oxygen and nitrogen in silicon oxynitride ($SiO_xN_y$) is varied to create a gradient in the refractive index of at least one of: the first dielectric layer, the second dielectric layer.

5. The liquid crystal cell of claim 1, wherein a thickness of the first dielectric layer lies in a range of 50 nm to 200 nm.

6. The liquid crystal cell of claim 1, wherein a thickness of the second dielectric layer lies in a range of 70 nm to 500 nm.

7. The liquid crystal cell of claim 1, wherein the second dielectric layer is etched to support alignments other than a homeotropic alignment.

8. The liquid crystal cell of claim 1, wherein the transparent electrode layer comprises any of:
   indium tin oxide (ITO),
   doped zinc oxide (ZnO), wherein ZnO is doped with aluminium or hydrogen, a mesh of metallic nanowires.

9. The liquid crystal cell of claim 1, wherein the at least two substrates are flexible.

10. A method for preparing a substrate, the method comprising:
    forming a first dielectric layer over the substrate;
    forming a transparent electrode layer over the first dielectric layer; and
    forming a second dielectric layer over the transparent electrode layer, wherein the first dielectric layer is formed in a manner that a refractive index of the first dielectric layer lies in a range between a refractive index of the substrate and a refractive index of the transparent electrode layer, and the second dielectric layer is formed in a manner that a refractive index of the second dielectric layer lies in a range between the refractive index of the transparent electrode layer and a refractive index of a liquid crystal material corresponding to a homeotropic alignment of the liquid crystal material.

11. The method of claim 10, wherein at least the second dielectric layer comprises silicon oxynitride ($SiO_xN_y$), and wherein silicon oxynitride is deposited using a silicon target and an atmosphere of oxygen, nitrogen and an inert gas.

12. The method of claim 11, wherein the step of forming a given dielectric layer comprises varying a relative concentration of oxygen and nitrogen in silicon oxynitride ($SiO_xN_y$) to create a gradient in the refractive index of at least one of: the first dielectric layer, the second dielectric layer.

13. A method of claim 10, further comprising etching the second dielectric layer to support alignments other than a homeotropic alignment.

* * * * *